Patented May 4, 1954

2,677,671

UNITED STATES PATENT OFFICE 2,677,671

INTERPOLYMER FROM LOWER ALKYL ESTER OF METHACRYLIC ACID, FATTY ACID ESTER OF EPOXY RESIN AND ESTER OF ALPHA,BETA UNSATURATED DICARBOXYLIC ACID WITH DIELS-ALDER ADDUCT OF CYCLOPENTADIENE AND ALLYL ALCOHOL

Henry Yuska, Kew Gardens, and Alfred M. Tringali, Springfield Gardens, N. Y., and John E. Hanle, Westfield, N. J., assignors to Interchemical Corporation, New York, N. Y., a corporation of Ohio No Drawing. Application August 5, 1952,
Serial No. 302,804

11 Claims. (Cl. 260—22)

This invention relates to new thermoplastic resins. More particularly the invention relates to new synthetic thermoplastic resins which are soluble in volatile organic solvents and comprise interpolymerization products of a lower alkyl ester of methacrylic acid, unsaturated fatty acid esters of polymeric polyhydric alcohols, and thermosetting esters of $\alpha,\beta$-unsaturated dicarboxylic acids with the Diels-Alder adduct of cyclopentadiene and allyl alcohol.

The new resins appear to be terpolymers, i. e. made up of three different interpolymerized starting materials, because they are prepared by interpolymerizing a mixture of the starting materials.

The unsaturated fatty acid esters of polymeric polyhydric alcohols used in the invention are prepared, for instance, according to U. S. Patent No. 2,456,408. The polymeric polyhydric alcohols have alternating aliphatic chains and aromatic nuclei united through ether oxygen and have the equivalent of from 5 to 20 hydroxyl groups per molecule. For the purposes of the present invention, the ester must contain unsaturated fatty oil acid. The molar ratio of unsaturated acid per mole of ester is preferably between 1 to 3.5 fatty oil acids containing conjugated ethylenic bonds and 1 to 6.8 acids containing nonconjugated ethylenic bonds. The ester starting material may contain saturated fatty acid in addition to the unsaturated fatty oil acid, in which event the total amount of fatty acid present may, of course, exceed the preferred upper limits given above. Esters of the commonly known unsaturated fatty oil acids are operable in the invention, e. g. esters of soya oil acids, linseed oil acids, and dehydrated castor oil acids. So far as is known any of the saturated higher fatty acids can be used with the unsaturated higher fatty acids to make the fatty acid ester starting material. The most readily available saturated fatty oil acids are coconut oil acids and for this reason these acids would be preferred if saturated fatty oil acids are used.

The unsaturated fatty acid esters preferred in the present invention are those prepared from polyhydric alcohols made from dihydroxy diphenyl dimethyl methane, especially 4,4'-dihydroxy diphenyl dimethyl methane or commercial mixtures of this 4,4'-isomer with lesser quantities of 2,2'-isomer and 4,2' (i. e. "Bisphenol A"), and epichlorohydrin. The polymeric polyhydric alcohols, which comprise the alcohol component of the polyester starting material, are commercially available products, e. g. Epon. They are prepared in accordance with known prior art methods, for instance, by reacting bisphenol, or other polyhydric phenols with polyhaloalcohols, epichlorohydrins, or polyepoxy compounds, to give polymeric polyhydric alcohols having the desired molecular weight and the desired number of alcoholic hydroxyl groups. For the purpose of the present invention, it is preferred that the polyhydric alcohol be prepared from bisphenol and that it have a molecular weight on the order of 800 to 4,000 and contain 5 to 20 hydroxyl groups (calculated from equivalent weight determinations) per molecule. The number of hydroxyl groups per molecule generally increases with the molecular weight of the polymeric polyhydric alcohol.

As stated heretofore the upper limit of moles of unsaturated fatty oil acid per mole of the ester that we prefer to use in the invention is 3.5 or 6.8 depending upon whether the fatty acid contains conjugated unsaturation or not. Ratios above these maximum limits may be used in certain instances only if a relatively small amount of the unsaturated fatty acid ester is employed in the reaction mixture. For instance, where 35% or less of the terpolymerization mixture consists of the fatty acid ester and the other 65% of the mixture contains only a minor proportion of methacrylate monomer, it is possible to increase the ratio of dehydrated castor oils to 4 or even 5 moles of acid per mole of fatty acid. In other words, the more reactive polyesters can be used by decreasing the amount of methacrylate monomer. The lower limit of fatty oil acid in the ester is not particularly critical, however, as a practical matter, it is preferred that there be at least one mole of the unsaturated fatty oil acid per mole of ester.

The methacrylic acid ester monomers used in the invention may be any of the lower alkyl esters of methacrylic acid, such as methyl methacrylate, ethyl methacrylate, propyl methacrylate, or butyl methacrylate.

The thermosetting ester reactants used in preparing terpolymers in accordance with the invention are prepared by esterifying $\alpha,\beta$-ethylenically unsaturated dicarboxylic acid reactants, such as maleic anhydride and fumaric acid, with a monohydric alcohol obtained by a Diels-Alder condensation of allyl alcohol and cyclopentadiene. Diels-Alder condensations of this type are described in U. S. Patent No. 2,352,606. Thermosetting esters made by esterifying the monohydric Diels-Alder adduct with $\alpha,\beta$-unsaturated acids are disclosed and claimed in U. S.

Patent No. 2,557,136. For the purposes of the present invention either the mono or the diester of the unsaturated dicarboxylic acid may be used. The di-ester is preferred, i. e. the ester formed by esterifying both the acid groups of the acid with the monohydric alcohol. The use of the di-ester appears to give a terpolymer resin having better cure properties than the resins using the mono-ester.

The thermosetting ester should preferably be employed in the invention as a substantially monomeric or unbodied ester. These thermosetting esters, as disclosed in U. S. Patent No. 2,557,136, are radially bodied by heating with or without catalyst and, of course, as the ester becomes bodied it increases in molecular weight and becomes more insoluble. For this season, it is preferred that the thermosetting resin have a low body, or viscosity. The low bodied esters that have been made to date have a viscosity of 20 to 125 poises at 25° C. and are believed to be substantially the monomeric esters. However, higher viscosity thermosetting esters can be used.

The ratios of the three reactants:

1. Unsaturated fatty acid esters of polymeric polyhydric alcohols
2. Thermosetting ester
3. Methacrylate monomer used in preparing the thermoplastic resins in accordance with the invention are not particularly critical. However, it has been found that the best resins are obtained when the unsaturated fatty acid ester reactant constitutes 35 to 75% of the total weight of reactants and the remaining 65 to 25% is made up of a mixture of the thermosetting ester reactant and the methacrylate monomer. The mixture of methacrylate monomer and thermosetting ester may contain 10 to 90% of either reactant.

The following examples will further illustrate the invention.

*Example 1.—Unsaturated fatty acid ester starting materials*

Typical unsaturated fatty acid esters of polymeric polyhydric alcohols used in the invention are as follows:

A. 1 mole of Epon 1001 (1) esterified with 2.14 moles of dehydrated castor oil acids.
B. 1 mole of Epon 1001 esterified with 2.2 moles of dehydrated castor oil acids.
C. 1 mole of Epon 1004 (2) esterified with 1.25 moles of dehydrated castor oil acids.
D. 1 mole of Epon 1004 esterified with 3.3 moles of dehydrated castor oil acids.
E. 1 mole of Epon 1004 esterified with 1 mole of oleic acid.
F. 1 mole of Epon 1004 esterified with 3.3 moles of oleic acid.
G. 1 mole of Epon 1004 esterified with 6.8 moles of oleic acid.
H. 1 mole of Epon 1004 esterified with 3.3 moles of castor oil acids.
I. 1 mole of Epon 1004 esterified with 3.3 moles of dehydrated castor oil acids.
J. 1 mole of Epon 1004 esterified with 4.4 moles of linseed oil acids.
K. 1 mole of Epon 1004 esterified with 3.3 moles of soy oil acids.
L. 1 mole of Epon 1007 (3) esterified with 3.3 moles of dehydrated castor oil acids.
M. 1 mole of Epon 1009 (4) esterified with 3.3 moles of dehydrated castor oil acids.
O. 1 mole of Epon 1004 esterified with 5 moles of dehydrated castor oil acids.

(1) Epon 1001 is a polyhydric alcohol formed from bisphenol and epichlorohydrin having a molecular weight of approximately 900 and contains approximately 7 hydroxyl groups per molecule based on equivalent weight determinations.

(2) Epon 1004 is similar to Epon 1001 except it has a molecular weight of approximately 1400 and contains approximately 8 hydroxyl groups.

(3) Epon 1007 is similar to Epon 1001 except it has a molecular weight of approximately 3000 and contains approximately 16 hydroxyl groups.

(4) Epon 1009 is similar to Epon 1001 except it has a molecular weight of approximately 3750 and contains approximately 19 hydroxyl groups.

*Example 2.—Thermosetting ester reactants*

The thermosetting ester reactant used in the invention is made, for instance, in accordance with the teachings of U. S. Patent 2,557,136. A typical procedure is as follows:

A mixture of 1078 parts of maleic anhydride and 3274 parts of 2,5-endomethylene-$\Delta^3$-tetrahydrobenzyl alcohol (adduct of allyl alcohol and cyclopentadiene) is heated and agitated under $CO_2$ at 180 to 190° C. for 8 hours. Water, liberated in the esterification is collected in a water trap which permits the return to the reaction mixture of any of the alcohol carried over by the water vapor. Excess alcohol is then removed by vacuum or steam distillation to yield 3500 parts of residue which is a light yellow oil having an acid number of 2.0 and a viscosity of 27 poises at 25° C.

*Example 3.—Interpolymerization procedure*

The preferred procedure for effecting the interpolymerization of the above fatty acid esters with the methacrylate monomer and the thermosetting ester reactant is to dissolve the mixture of reactants in an aromatic solvent, such as xylol or Solvesso 100 to give a 50 to 75% concentration of reactive ingredients. About 1% of peroxide catalyst, based on total reactive ingredients, is then added to the solution. The peroxide catalyst may be any of the conventionally used peroxide catalysts such as benzoyl peroxide, t-butyl perbenzoate, and ditertiary butyl peroxide. The catalyzed solution is healted quickly to reflux. As the methacrylate monomer is converted to resin, the temperature of the refluxing mixture gradually rises to about 140–145° C. After the reaction has continued for about 1½ hours, an additional ½ to 1% of catalyst may be added and the refluxing continued for another 1½ hours to obtain at least 80% conversion of the methacrylate monomer to resin. The percent conversion is determined on the basis of the total non-volatile content of the reaction mixture. The viscosity of these resins, when cut to 50% total non-volatile in xylol may vary within the range of 2 to about 200 poises at 25° C. depending largely on the ratio of reactants and particular catalyst used.

The following resins illustrate various ratios and types of reactants that are operable in the invention.

1. 50 parts ester D, 40 parts methyl methacrylate and 10 parts of the ester of Example 2 polymerized with 2% tertiary butyl peroxide to 91.3% conversion of the methyl methacrylate gave a resin having a viscosity of 201 poises at 25° C. at 50% solids in xylol.

2. 50 parts ester D, 30 parts methyl methacrylate and 20 parts of the ester of Example 2 polymerized with 2% tertiary butyl perbenzoate catalyst to 90% conversion gave a resin having a viscosity of 20.9 poises at 25° C. at 50% solids in xylol.

3. 50 parts ester D, 30 parts methyl methacrylate, and 20 parts of the ester prepared according to Example 2 polymerized with 2% di-tertiary butyl peroxide to 86.7% conversion of the methyl methacrylate gave a resin having a viscosity of 88.8 poises at 25° C. and a 50% solids in xylol.

4. 50 parts ester D, 20 parts methyl methacrylate, and 30 parts of the ester of Example 2, polymerized with 2% di-tertiary butyl peroxide to 79.5% conversion of the monomer gave a resin having a viscosity of 50.3 poises at 23° C. and at 50% solids in xylol.

5. 50 parts ester D, 40 parts methyl methacrylate and 10 parts of the ester of Example 2, polymerized with 1½% of di-tertiary butyl peroxide to 89.2% conversion of the monomer gave a resin having a viscosity of 81.7 poises at 50% solids in xylol.

6. 50 parts ester D, 40 parts butyl methacrylate, and 10 parts of an ester prepared according to Example 2 polymerized with 1½% of di-tertiary butyl peroxide to 88.5% conversion of the monomer gave a resin having a viscosity of 20 poises at 54.6% solids in xylol.

7. 50 parts ester D, 30 parts butyl methacrylate, and 20 parts of an ester prepared according to Example 2, polymerized with 2% di-tertiary butyl peroxide to 80-90% conversion of the monomer gave a resin having a viscosity of 63 poises at 50% solids in xylol.

8. 50 parts ester D, 20 parts butyl methacrylate and 30 parts of an ester prepared according to Example 2, polymerized with 2% di-tertiary butyl peroxide to 70-80% conversion gave a resin having a viscosity of 71.4 poises at 50% solids in xylol.

9. 35 parts of ester O, 13 parts of methyl methacrylate and 52 parts of an ester prepared according to Example 2 polymerized with 1½% of t-butyl perbenzoate to 84.6% conversion of monomer gave a resin having a viscosity of 10.1 poises at 50% solids in xylol.

10. 50 parts of ester D, 20 parts of methyl methacrylate and 30 parts of the thermosetting ester formed from two moles of 2,5-endomethylene-$\Delta^3$-tetrahydrobenzyl alcohol and one mole fumaric acid, polymerized with 1% cumene hydroperoxide to a conversion of 84.3% of the monomer gave a resin having a viscosity of 106 poises at 50% solids in xylol.

11. 50 parts ester D, 20 parts of methyl methacrylate and 30 parts of a bodied (soft solid at 25° C.) diester of 2,5-endomethylene-$\Delta^3$-tetrahydrobenzyl alcohol and maleic acid, polymerized to 87.5% conversion of the monomer gave a resin having a viscosity of 7.5 poises at 58.3% solids in xylol.

The resins of the present invention are useful as film forming resins in coating compositions such as varnish, enamels, lacquers and paints. In such applications, the resin films, either pigmented or unpigmented, have good adhesion to wood and metal surfaces. The resin bakes out to a film having superior hardness to baked films prepared from the Epon esters from which they are prepared.

The molecular weights of the polymeric polyhydric alcohols listed in Example 1 are average molecular weights as given by the supplier. The number of hydroxyl groups for each of the polyhydric alcohols was calculated by dividing the average molecular weights of the polyhydric alcohol by the equivalent weights.

We claim:

1. As a new synthetic resin, the peroxide catalyzed terpolymerization products of a mixture of (1) a lower alkyl ester of methacrylic acid containing 1 to 4 carbon atoms in said alkyl group, (2) a polyhydric alcohol ester obtained by esterifying (a) one mole of a polymeric polyhydric alcohol having alternating aliphatic chains and aromatic nuclei united through ether oxygen and containing from 5 to 20 alcoholic hydroxyl groups per molecule with (b) at least one mole of an ethylenically unsaturated fatty oil acid, and (3) a thermosetting ester obtained by esterifying an $\alpha,\beta$-ethylenically unsaturated dicarboxylic reactant with the Diels-Alder adduct of cyclopentadiene and allyl alcohol.

2. A resin as in claim 1 wherein the thermosetting ester reactant is obtained by esterifying one mole of an $\alpha,\beta$-ethylenically unsaturated dicarboxylic reactant with two moles of the Diels-Alder adduct of cyclopentadiene and allyl alcohol.

3. As a new synthetic resin the peroxide catalyzed terpolymerization product of a mixture of (1) a lower alkyl ester of methacrylic acid containing 1 to 4 carbon atoms in said alkyl group, (2) a polyhydric alcohol ester obtained by esterifying (a) a polymeric polyhydric alcohol having alternating aliphatic chains and aromatic nuclei united through ether oxygen and containing from 5 to 20 alcoholic hydroxyl groups per molecule with (b) ethylenically unsaturated fatty oil acids, the ratio of (a) to (b) being between 1 to 1 and 1 to 6.8 for fatty acids containing non-conjugated ethylenic double bonds, and up to between 1 to 1 and 1 to 3.5 for fatty acids containing conjugated ethylenic double bonds, and (3) a thermosetting ester obtained by esterifying an $\alpha,\beta$-ethylenically unsaturated dicarboxylic acid reactant with the Diels-Alder adduct of cyclopentadiene and allyl alcohol.

4. A resin as in claim 3 wherein the thermosetting ester reactant is obtained by esterifying one mole of an $\alpha,\beta$-ethylenically unsaturated dicarboxylic reactant with two moles of the Diels-Alder adduct of cyclopentadiene and allyl alcohol.

5. As a new synthetic resin, the peroxide catalyzed terpolymerization product of a mixture of (1) a lower alkyl ester of methacrylic acid containing 1 to 4 carbon atoms in said alkyl group, (2) a polyhydric alcohol ester obtained by esterifying (a) a polyhydric alcohol having alternating aliphatic chains and aromatic nuclei united through ether oxygen and containing from 5 to 20 alcoholic hydroxyl groups per molecule with (b) ethylenically unsaturated fatty oil acids, the ratio of (a) to (b) being between 1 to 1 and 1 to 6.8 for fatty acids containing non-conjugated ethylenic double bonds, and up to between 1 to 1 and 1 to 3.5 for fatty acids containing conjugated ethylenic double bonds, and (3) a thermosetting ester obtained by esterifying one mole of an $\alpha,\beta$-ethylenically unsaturated dicarboxylic acid reactant with two moles of the Diels-Alder adduct of cyclopentadiene and allyl alcohol; the said reaction mixture containing from 35 to 75% of the polyhydric alcohol ester.

6. A resin as in claim 5 wherein the lower alkyl ester of methacrylic acid is methyl methacrylate.

7. A resin as in claim 5 wherein the lower alkyl ester of methacrylic acid is butyl methacrylate.

8. As a new synthetic resin, the peroxide catalyzed terpolymerization product of (1) 35 to 75 parts of a polyhydric alcohol ester obtained by esterifying (a) a polyhydric alcohol having alternating aliphatic chains and aromatic nuclei united through ether oxygen and containing from 5 to 20 alcoholic hydroxyl groups per molecule with (b) ethylenically unsaturated fatty oil acids, the ratio of (a) to (b) being between 1 to 1 and 1 to 6.8 for fatty acids containing non-conjugated ethylenic double bonds and up to between 1:1 and 1 to 3.5 for fatty acids containing conjugated ethylenic double bonds, with (2) 65 to 25 parts of a mixture consisting of 10 to 90% of a lower alkyl ester of methacrylic acid containing 1 to 4 carbon atoms in said alkyl group and 90 to 10% of a thermosetting ester obtained by esterifying one mole of an $\alpha,\beta$-ethylenically unsaturated dicarboxylic reactant with two moles of the Diels-Alder adduct of cyclopentadiene and allyl alcohol.

9. As a new synthetic resin, the peroxide catalyzed interpolymerization product of (1) 35 to 75 parts of a polyhydric alcohol ester obtained by esterifying (a) one mole of a polyhydric alcohol having alternating aliphatic chains and aromatic nuclei united through ether oxygen and containing from 5 to 20 alcoholic hydroxyl groups per molecule, with (b) 1 to 3.5 moles of dehydrated castor oil fatty acids, with (2) 65 to 25 parts of a mixture consisting of 10 to 90% of a lower alkyl ester of methacrylic acid containing 1 to 4 carbon atoms in said alkyl group and 90 to 10% of a thermosetting ester obtained by esterifying one mole of an $\alpha,\beta$-ethylenically unsaturated dicarboxylic reactant with two moles of the Diels-Alder adduct of cyclopentadiene and allyl alcohol.

10. A resin as in claim 9 wherein the lower alkyl ester of methacrylic acid is methyl methacrylate.

11. A resin as in claim 9, wherein the lower alkyl ester of methylacrylic acid is butyl methacrylate.

References Cited in the file of this patent

UNITED STATES PATENTS

| Number | Name | Date |
|---|---|---|
| 2,596,737 | Tess et al. | May 13, 1952 |